US012742875B2

(12) United States Patent
Feng et al.

(10) Patent No.: US 12,742,875 B2
(45) Date of Patent: Sep. 22, 2026

(54) SYSTEM AND METHOD FOR IMPROVED WLAN SENSING MEASUREMENT REPORT

(71) Applicant: MEDIATEK INC., Hsinchu City (TW)

(72) Inventors: Shuling Feng, San Jose, CA (US); Jianhan Liu, San Jose, CA (US); Thomas Edward Pare, Jr., San Jose, CA (US); Tsung-Han Tsai, Hsinchu City (TW)

(73) Assignee: MEDIATEK INC. (TW)

( * ) Notice: Subject to any disclaimer, the term of this patent is extended or adjusted under 35 U.S.C. 154(b) by 349 days.

(21) Appl. No.: 18/226,616

(22) Filed: Jul. 26, 2023

(65) Prior Publication Data

US 2024/0151845 A1 May 9, 2024

Related U.S. Application Data

(60) Provisional application No. 63/382,301, filed on Nov. 4, 2022.

(51) Int. Cl.
*G01S 13/76* (2006.01)
*H04L 25/02* (2006.01)
(Continued)

(52) U.S. Cl.
CPC .......... *G01S 13/765* (2013.01); *H04L 25/022* (2013.01); *H04W 24/10* (2013.01); *H04W 84/12* (2013.01)

(58) Field of Classification Search
CPC ..... G01S 13/765; H04B 17/202; H04B 17/24; H04B 17/309; H04B 7/0626; H04W 24/08; H04W 24/10; H04W 84/12; H04L 25/022
See application file for complete search history.

(56) References Cited

U.S. PATENT DOCUMENTS

2004/0252632 A1* 12/2004 Bourdoux ............ H04B 17/401 370/210
2018/0287568 A1* 10/2018 Malik ................. H04L 25/0222
(Continued)

FOREIGN PATENT DOCUMENTS

EP 4297474 A1 12/2023

OTHER PUBLICATIONS

Feng; et al. "WLAN Sensing Measurement CSI Report With RX Frequency Response Category Index" 11 pp. Aug. 3, 2022. doc.: IEEE 802.11-22/1254r2.

(Continued)

*Primary Examiner* — Timothy A Brainard

(57) ABSTRACT

Embodiments of the present invention provide methods and devices for performing wireless sensing operations that can accommodate different Rx frequency responses with minimum PHY changes to increase the performance and reliability of wireless sensing in wireless local area network (WLAN) networks. Rx frequency response information can be obtained as channel state information (CSI) in a loopback test and can further be normalized with the total gain in the receiver chain leading to CSI estimation. Moreover, different Rx frequency responses can be categorized into limited groups with underlying circuit conditions based on their frequency response variations. The different Rx frequency responses can be indicated in subfields of a CSI report transmitted to the sensing initiator for performing sensing operations with the sensing responder.

15 Claims, 5 Drawing Sheets

(51) Int. Cl.
*H04W 24/10* (2009.01)
*H04W 84/12* (2009.01)

(56) References Cited

U.S. PATENT DOCUMENTS

2021/0266838 A1* 8/2021 Chong .............. H04W 52/0235
2023/0221423 A1* 7/2023 Beg ....................... G01S 13/003
342/27

OTHER PUBLICATIONS

Feng; et al. "WLAN Sensing Measurement CSI Report With RX Frequency Response Category Index" 10 pp. Aug. 3, 2022. doc.: IEEE 802.11-22/1254r3.

* cited by examiner

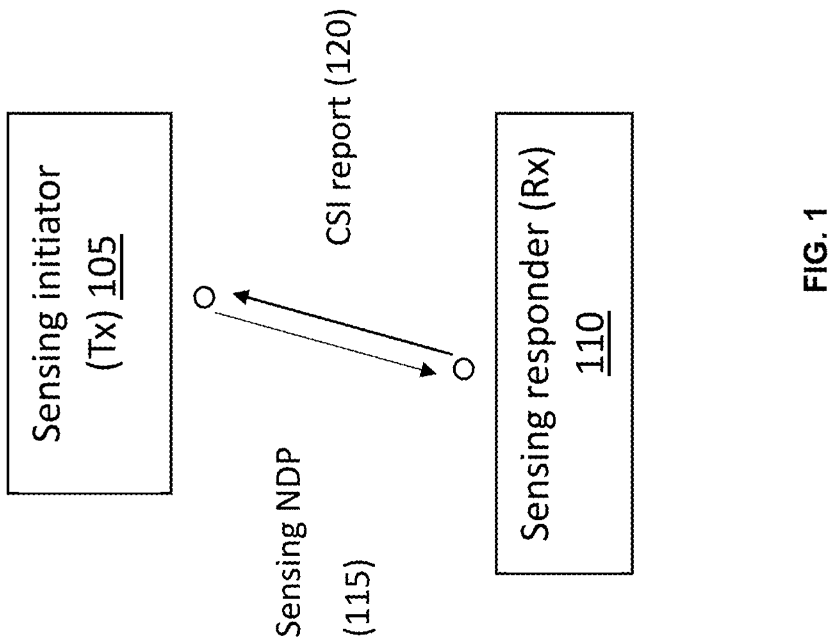
FIG. 1

SYSTEM AND METHOD FOR IMPROVED WLAN SENSING MEASUREMENT REPORT

CROSS-REFERENCE TO RELATED APPLICATIONS

This application claims the benefit of and priority to provisional patent application Ser. No. 63/382,301, with filing date Nov. 4, 2022, which is hereby incorporated by reference in its entirety.

FIELD

Embodiments of the present invention generally relate to the field of wireless communications. More specifically, embodiments of the present invention relate to systems and methods for wireless sensing and measuring.

BACKGROUND

Wireless sensing operations are performed by a wireless device to detect and analyze the wireless environment around them. These operations can enhance the capabilities of wireless devices by providing the devices with real-time information about the wireless environment to optimize their performance, improve security, detect appearance and movement, and deliver a better overall user experience.

Wireless sensing is typically implemented through specialized hardware and software components, such as wireless channel state information (CSI) measurement, buffering circuits, and sensing measurement procedure processing software, integrated into WLAN devices. These components enable the devices to measure and analyze the wireless CSI and to make intelligent decisions based on the observed data. Wireless CSI generally refers to the information about the characteristics and conditions of a wireless communication channel, and can provide details about the channel's quality, such as its fading, interference, and noise characteristics. Moreover, CSI can include parameters like signal strength, noise power, interference levels, and other relevant channel metrics. By acquiring accurate CSI, a wireless device can make informed decisions regarding channel selection, resource allocation, and transmission strategies. Channel estimation is one type of CSI measurement, where the receiver estimates the channel response by sending known training signals and analyzes the received signal to extract information about the channel's properties.

Wireless sensing operations can be affected by other device operations that result in variations in Rx frequency response, and moreover Rx frequency response vs gain variations can also change in response to variations in bandwidth. Adjustments to low noise amplifier (LNA) switches and various gain amplifiers (VGAs) by the receiver, for example, may cause RF/analog filter changes which can result in variations in the normalized Rx frequency response. Moreover, due to power measurement errors, the receiver may use different LNA, VGA, and digital gain settings when receiving different sensing NDP frames, even if they are transmitted at the same power level in the same channel environment.

While some receivers have consistent frequency response, where variations can hardly be detected, other receivers have frequency response variations that are significant enough to affect channel state information (CSI) estimation accuracy, which can greatly reduce sensing performance, especially when small CSI variations are expected between sensing instances. Accordingly, an approach to performing wireless sensing operations that can address variations in Rx frequency response is desired and would improve wireless performance.

SUMMARY

Embodiments of the present invention provide methods and devices for performing wireless sensing operations that can accommodate different Rx frequency responses with minimum PHY changes to increase the performance and reliability of wireless sensing.

According to one disclosed embodiment, a method of wireless sensing performed over a wireless network is disclosed. The method includes transmitting a sensing null data packet (NDP), receiving a channel state information (CSI) report responsive to the sensing NDP, wherein the CSI report comprises receiver frequency response information determined by performing a channel estimation operation, and performing a wireless sensing operation according to the frequency response information.

According to some embodiments, transmitting a sensing NDP is performed by a sensing initiator, and the CSI report is received from a sensing responder. The frequency response information pertains to a frequency response of the sensing responder, and performing a wireless sensing operation comprises indicating the frequency response variation of the sensing responder.

According to some embodiments, the variation in frequency response is caused by the sensing responder adjusting a low noise amplifier (LNA) switch for receiving data.

According to some embodiments, the variation in frequency response is caused by the sensing responder device adjusting a various gain amplifier (VGA) for receiving data.

According to some embodiments, the CSI report includes at least one of: a receiver operating point (OP) gain type subfield, and a receiver OP gain index subfield.

According to some embodiments, the receiver OP gain type subfield is a 2-bit subfield including at least one of: a value of 0 indicating that neither an OP index nor a gain index are reported, and that values of the receiver OP gain index subfield are reserved, a value of 1 indicating that a receiver OP index is reported in the receiver OP gain index subfield, wherein the receiver OP gain index includes different frequency response categories, a value of 2 indicating that a receiver gain index is reported in the receiver OP gain index subfield, wherein the receiver gain index includes different values associated with different receiver gain settings, and a value of 3 is reserved.

According to some embodiments, the receiver OP gain index is a segregated index including a plurality of receiver OP gain index values corresponding to different receiver antennas.

According to some embodiments, the receiver OP gain index is divided into octets.

According to some embodiments, the receiver OP gain index further includes a number of padding bits ($N_{pad}$) between the receiver OP gain index values of the plurality of receiver OP gain index values according to the equation, where m represents a number of bits per subfield:

$$N_{pad} = \left\lceil \frac{m}{8} \right\rceil \times 8 - m,\ 0 \le N_{pad} \le 7.$$

According to some embodiments, the method further includes receiving another CSI report from the sensing responder, and comparing the CSI report to the another CSI report to detect small changes in frequency response using a same receiver configuration.

According to some embodiments, the CSI report and the another CSI report are generated during the same sensing measurement report phase.

According to some embodiments, the method includes receiving another CSI report from the sensing responder device, and combining the CSI report to the another CSI report to more effectively detect small changes in frequency response using a same receiver configuration.

According to a different embodiment, a transmitter apparatus for performing wireless sensing is disclosed. The apparatus includes a processor, a memory coupled to the processor and operable to store data, and a radio under control of said processor and operable to perform wireless sensing. The processor is operable to cause the radio to transmit a sensing null data packet (NDP), receive a channel state information (CSI) report responsive to the sensing NDP, the CSI report including receiver frequency response information, and perform a wireless sensing operation according to the frequency response information.

According to some embodiments, the radio operates substantially in accordance with standards of IEEE 802.11bf.

According to some embodiments, the variation in frequency response is caused by an adjustment to a low noise amplifier (LNA) switch for receiving data.

According to some embodiments, the variation in frequency response is caused by an adjustment to a various gain amplifier (VGA) for receiving data.

According to some embodiments, the CSI report includes a receiver operating point (OP) gain type subfield, and a receiver OP gain index subfield.

According to some embodiments, the receiver OP gain type subfield is a 2-bit subfield including at least one of: a value of 0 indicating that neither a receiver OP index nor a gain index are reported, and that values of the receiver OP gain index subfield are reserved, a value of 1 indicating that a receiver OP index is reported in the binary receiver OP gain index subfield. The receiver OP index includes different frequency response categories, a value of 2 indicating that a receiver gain index is reported in the receiver OP gain index subfield, and the receiver gain index includes different gain values associated with different frequency response variations. The value of 3 is reserved.

According to some embodiments, the receiver OP gain index is a segregated index including different receiver OP gain index values corresponding to different receiver antennas, and a number of padding bits ($N_{pad}$) between the different receiver OP gain index values according to the equation, where m represents a number of bits per subfield:

$$N_{pad} = \left\lceil \frac{m}{8} \right\rceil \times 8 - m,\ 0 \le N_{pad} \le 7.$$

According to another embodiment, a non-transitory computer-readable storage medium having embedded therein program instructions, which when executed by one or more processors of a transmitter device, causes the transmitter device to execute a method of wireless sensing is disclosed. The method includes transmitting a sensing null data packet (NDP), receiving a channel state information (CSI) report responsive to the sensing NDP, the CSI report including receiver frequency response information, and performing a wireless sensing operation according to the frequency response information to mitigate a frequency response variation.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a block diagram depicting an exemplary sensing operation performed by IEEE 802.11bf wireless devices according to embodiments of the present invention.

DETAILED DESCRIPTION

Figure 2:
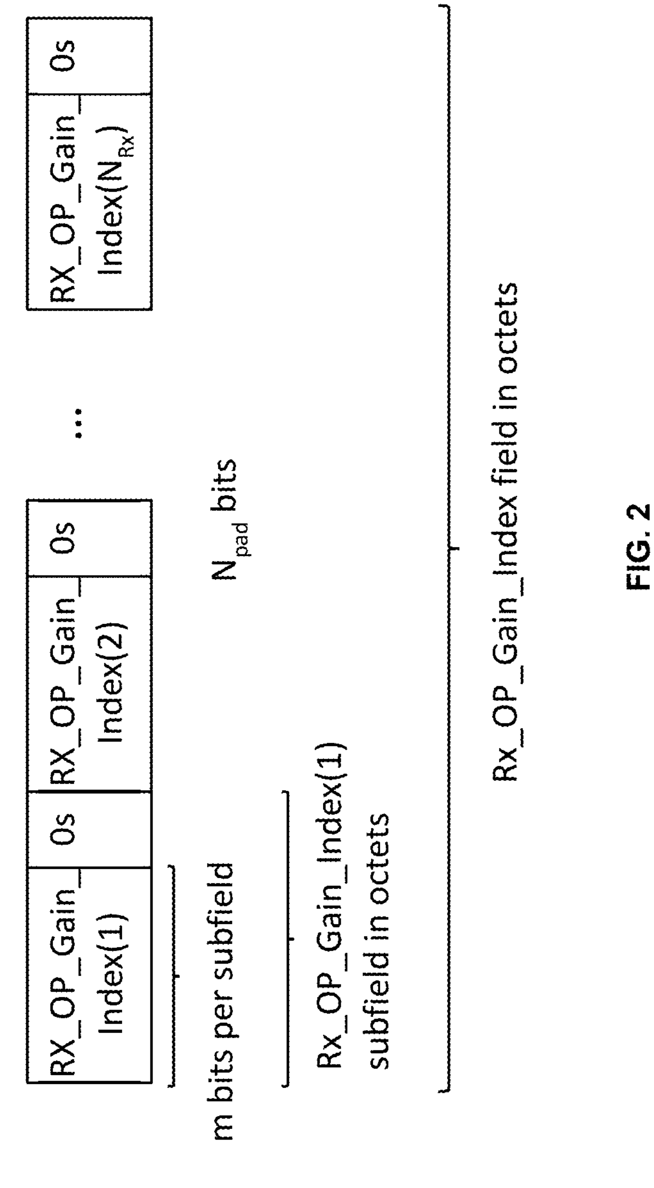
FIG. 2 is a block diagram depicting an exemplary RX_OP_Gain_Index subfield divided into octets according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIG. 4) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic announces capable of being stored, transferred, combined, compared, and otherwise manipulated in a computer system. It has proven convenient at times, principally for reasons of common usage, to refer to these announces as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "setting," "storing," "transmitting," "retransmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Wireless Sensing Operations for Devices Having Various Frequency Responses

Embodiments of the present invention provide methods and devices for performing wireless sensing operations that can accommodate different Rx frequency responses with minimum PHY changes to increase the performance and reliability of wireless sensing in wireless local area network (WLAN) networks.

According to embodiments described herein, Rx frequency response information can be obtained as channel state information (CSI) in a loopback test, and can further be normalized with the total gain in the receiver chain leading to CSI estimation. Moreover, different Rx frequency responses can be categorized into limited groups with underlying circuit conditions based on their frequency response variations. For example, if a receiver's frequency response varies according to LNA/VGA gain settings, the frequency responses can be categorized into major groups, with each group corresponding to one or more LNA/VGA gain settings. The different categories can be numbered using an Rx operating point (OP) index i. Within each group, Rx frequency response variation is considered insignificant. The categorization can be based on one or more metrics derived from magnitude and/or phase variations of the Rx frequency response, according to embodiments.

The sensing responder may provide a CSI report with an Rx gain index of specific frequency responses, or an Rx OP index that includes predefined frequency response categories. The CSI report is generated by performing one or more channel estimation operations. The index can be included in the CSI report to specify gain index values or the frequency response variations for the underlying circuit conditions. The Rx OP index enables the sensing initiator to combine or compare different CSIs obtained from sensing NDPs with the same measurement setup over a sensing session, and the Rx OP index can be reported back to the sensing initiator with the CSI report during the sensing measurement report phase. The Rx OP index may further assist the sensing initiator in reliably detecting small CSI variations. CSIs with the same valid Rx OP index are typically generated within the same category of normalized receiver frequency response, and the different CSIs can be combined for better sensing performance, or compared for detecting small changes in frequency response, for example.

Depending on types of applications, the sensing initiator can also choose to combine or compare CSIs with different Rx operating indexes if the CSI variation risks caused by Rx frequency response changes are determined to be low. Overall, the Rx OP index is defined by the best effort of the sensing receiver. From a chip vendor perspective, the Rx OP index offers flexibility for sensing using normalized Rx frequency response variations. For example, a chip vendor can set the Rx OP index value to an invalid value to indicate that Rx frequency response variations are not categorized, or can set the Rx OP index to a fixed valid value to indicate its Rx frequency response doesn't vary significantly across all gain settings. As another example, if a chip vendor determines that its Rx frequency responses vary in 4 major patterns (e.g., as determined in lab sample tests or selected gain setting product tests), the vendor can categorize these variations and their underlying circuit conditions into 4 categories and map them to 4 valid Rx OP index values, which can be used to improve the performance and reliability of sensing operations. Furthermore, the Rx OP index helps to improve sensing performance when small CSI variations need to be detected by allowing combination or comparison of different CSI reports obtained from successive NDPs using the same valid Rx OP index value.

FIG. 1 depicts an exemplary sensing operation performed by IEEE 802.11bf wireless devices in accordance with embodiments of the present invention. In the example of FIG. 1, a sensing null data packet (NDP) 115 is transmitted by sensing initiator 105, which is configured as a sensing transmitter, for receipt by sensing responder 110, which is configured as a sensing receiver. A receiver OP gain type subfield, e.g., Rx_OP_Gain_Type, and a receiver OP gain index subfield, e.g., Rx_OP_Gain_Index, are included in CSI report 120 by the sensing responder 110 and are reported to the sensing initiator 105. For example, different device reporting types can be defined in the Rx_OP_Gain_Type field, and different groups corresponding to different receiver frequency response or LNA/VGA gain settings can be defined and numbered using the Rx_OP_Gain_Index field to improve sensing performance when the receiver's frequency response varies.

In one exemplary embodiment, four RX_OP_Gain_Type values are defined using a 2-bit field. Specifically, binary value (decimal value 0) indicates neither Rx OP index nor Rx gain index is reported, and that the Rx_OP_Gain_Index values are invalid; binary value [01] (decimal value 1) indicates that the Rx OP index is reported in the Rx_OP_Gain_Index field; binary value [10] (decimal value 2) indicates that the Rx gain index is reported in Rx_OP_Gain_Index; and binary value [11] (decimal value 3) is a reserved value.

According to other embodiments, a segregated Rx_OP_Gain_Index report can be used. In this case, the Rx OP Gain Index field contains a sub-field Rx OP Gain Index (i) for the i-th receiver station/chain used for CSI estimation. The number of reported receivers is indicated in field NRx in CSI report. Rx_OP_Gain_Index (i) is typically the same size for each receiver. For example, as depicted in FIG. 2, RX_OP_Gain Index subfield 200 can be divided into octets, and the sub-fields can be padded with 0 s as necessary according to embodiments of the present invention. In one exemplary embodiment, the number of padded bits Npad is calculated using Equation I:

$$N_{pad} = \left\lceil \frac{m}{8} \right\rceil \times 8 - m,\ 0 \le N_{pad} \le 7 \quad \text{[Equation I]}$$

In Equation I, m represents the number of bits per subfield. For example, when m=8, RX OP Gain Index (i) is 1 octet according to Equation I, and no padding is used (Npad=0). In the example of FIG. 2, RX_OP_Gain_Index (1) is followed by 0 bits of padding, RX_OP_Gain_Index (2) is followed by 0 bits of padding, and so on.

Figure 3:
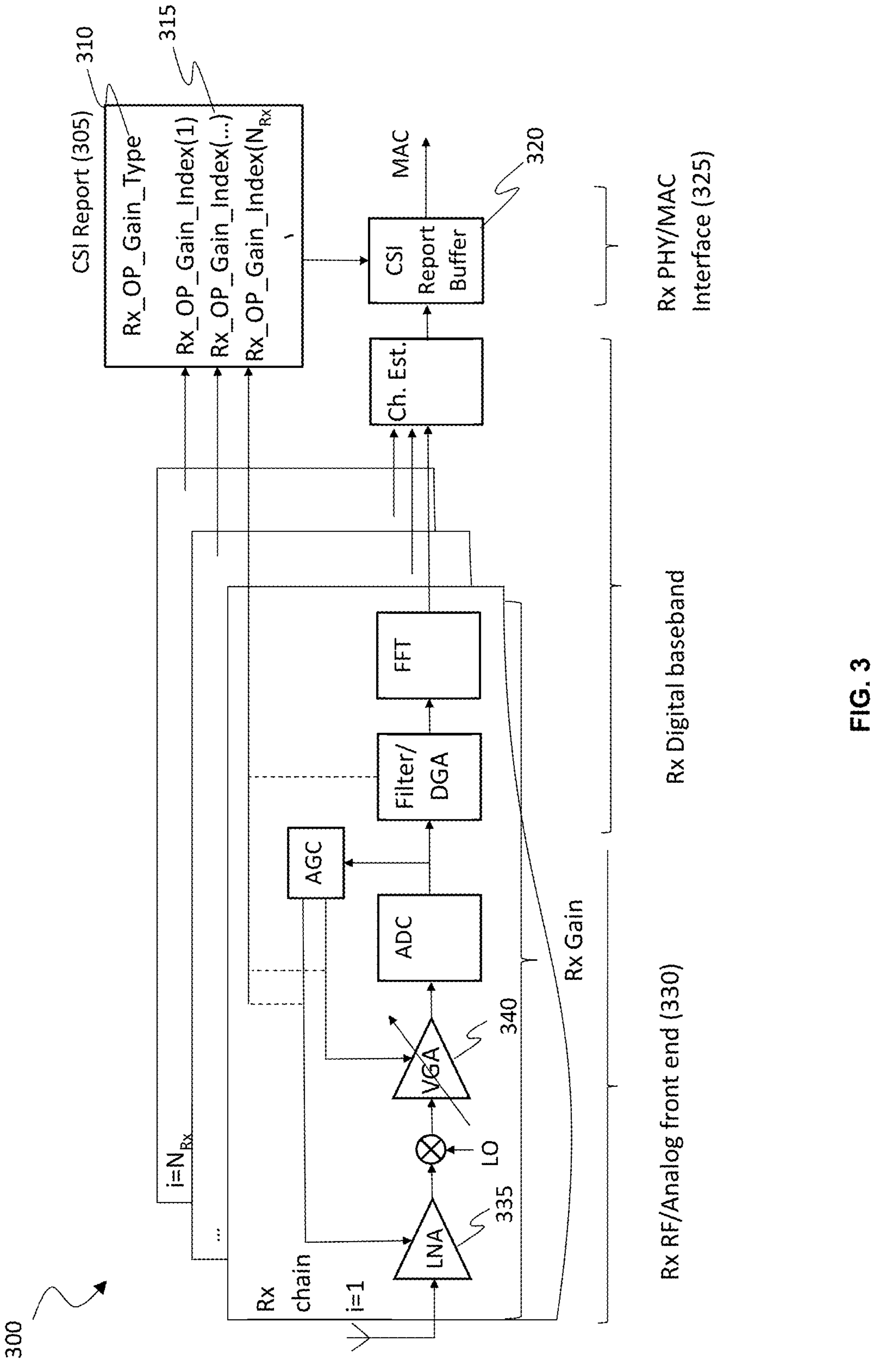
FIG. 3 is a block diagram depicting an exemplary sensing measurement receiver with varying frequency response according to embodiments of the present invention.

FIG. 3 depicts an exemplary sensing measurement receiver block diagram 300 according 300 to embodiments of the present invention. The embodiment depicted in FIG. 3 is similar to existing sensing measurement receivers with modifications to the CSI Report 305 to include an Rx_OP_Gain_Type 310 subfield and one or more Rx_OP_Gain_Index values 315. A device with multiple receiving stations (e.g., a multi-link device) can include multiple Rx_OP_Gain_Index values, one for each receiving station. The CSI Report Buffer 320 stores received CSI reports as part of the Rx PHY/MAC interface 325 to accommodate frequency response variations of Rx RF/Analog front end 330. For example, different LNA 335 and VGA 340 settings may lead to different Rx frequency responses that can be accommodated for performing sensing operations based on the values of Rx_OP_Gain_Type subfield 310 and Rx_OP_Gain_Index values 315.

After receiving the CSI report with the Rx_OP_Gain_Type 310 subfield and Rx_OP_Gain_Index values 315, the receiver frequency response variations information indicated in the Rx_OP_Gain_Type 310 subfield and/or Rx_OP_ Gain_Index can be used to improve sensing performance. In this way, sensing performance and reliability is improved even when the receiver's frequency response varies, which helps improve security, detect appearance and movement, and deliver a better overall user experience.

Figure 4:
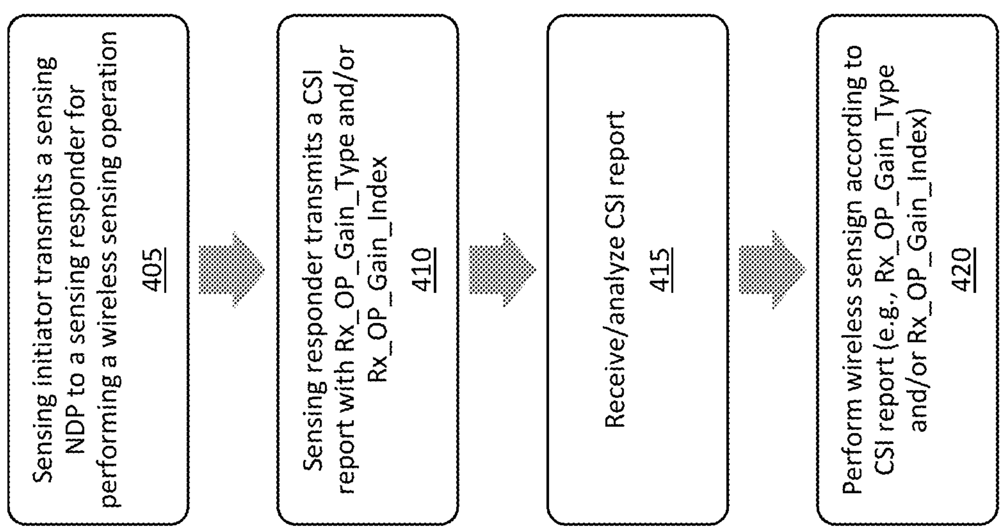
FIG. 4 is a flow chart of an exemplary computer implemented process for performing a wireless sensing operation that accommodates varying receiver frequency responses using subfields of a CSI report according to embodiments of the present invention.

FIG. 4 is a flowchart depicting steps of an exemplary computer implemented process 400 for performing wireless sensing that is adaptable to variations in receiver frequency response according to embodiments of the present invention.

At step 405, a sensing initiator (also a sensing transmitter) transmits a sensing NDP to a sensing responder (also a sensing receiver) for performing a wireless sensing operation.

At step 410, responsive to the sensing NDP, the sensing responder transmits a CSI report. The CSI report includes an Rx_OP_Gain_Type subfield and an Rx_OP_Gain_Index subfield used to communicate information pertaining to frequency response variations of the sensing responder. For example, the Rx_OP_Gain_Type subfield can indicate that no gain index is reported, that an Rx OP index value is reported in the Rx_OP_Gain_Index field, or that the Rx gain index value is reported in Rx_OP_Gain_Index.

At step 415, the CSI report is received by the sensing initiator. When the CSI reports include the same Rx_OP_Gain_Index value, the sensing initiator can combine or compare CSIs obtained from successive sensing NDPs for the same measurement setup ID in a sensing session. Moreover, the sensing initiator can combine or compare CSIs with different Rx operating index values after the CSI variation risks caused by Rx frequency response changes is determined to be low.

At step 420, a wireless sensing operation is performed between the sensing initiator and the sensing responder according to the Rx_OP_Gain_Type subfield and/or the Rx_OP_Gain_Index subfield included in the CSI report.

Exemplary Computer Controlled System

Figure 5:
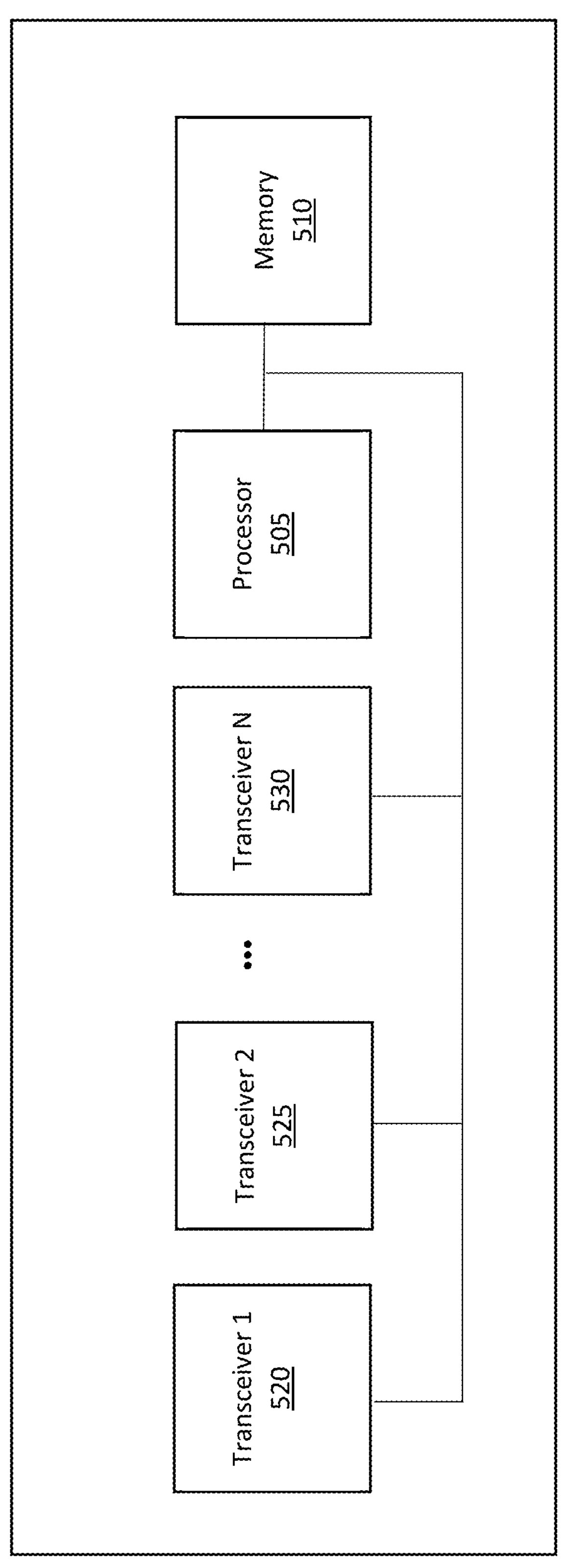
FIG. 5 is a block diagram depicting an exemplary computer system platform upon which embodiments of the present invention may be implemented.

FIG. 5 depicts an exemplary wireless device 500 upon which embodiments of the present invention can be implemented. Embodiments of the present invention are drawn to electronic systems capable of performing wireless sensing operations according to an enhanced CSI report that typically includes an Rx_OP_Gain_Type subfield and an Rx_OP_Gain_Index subfield to define frequency response characteristics of a sensing responder (receiver). Wireless device 500 can be a sensing initiator that transmits a sensing NDP to a sensing responder, or a sensing responder that receives a sensing NDP and transmits a CSI report having the Rx_OP_Gain_Type and an Rx_OP_Gain_Index subfields. Based on these subfields, the sensing initiator can derive information about the sensing receiver's frequency response variations.

The wireless device 500 includes a processor 505 for running software applications and optionally an operating system. Memory 510 can include read-only memory and/or random access memory, for example, to store applications and data for use by the processor 505 and data received or transmitted by transceivers 520, 525, and 530. The wireless device 500 can include fewer or more transceivers according to some embodiments. The transceivers 520, 525, 530 communicate with other electronic devices over a wireless network (e.g., WLAN) and typically operate according to IEEE standards (e.g., IEEE 802.11bf).

Embodiments of the present invention are thus described. While the present invention has been described in particular embodiments, it should be appreciated that the present invention should not be construed as limited by such embodiments, but rather construed according to the following claims.

What is claimed is:

1. A method of wireless sensing performed over a wireless network, the method comprising:

transmitting, by a sensing initiator, a sensing null data packet (NDP);

receiving, from a sensing responder, a channel state information (CSI) report responsive to the sensing NDP, wherein the CSI report comprises receiver frequency response information determined by performing a channel estimation operation; and performing a wireless sensing operation according to the frequency response information, wherein the frequency response information pertains to a frequency response of the sensing responder, and the performing a wireless sensing operation comprises indicating the frequency response variation of the sensing responder, wherein the CSI report comprises at least one of: a receiver operating point (OP) gain type subfield; and a receiver OP gain index subfield, and wherein the receiver OP gain type subfield is a 2-bit subfield comprising at least one of: a value of 0 indicating that neither an OP index nor a gain index are reported, and that values of the receiver OP gain index subfield are reserved; a value of 1 indicating that a receiver OP index is reported in the receiver OP gain index subfield, wherein the receiver OP gain index comprises different frequency response categories; a value of 2 indicating that a receiver gain index is reported in the receiver OP gain index subfield, wherein the receiver gain index comprises different values associated with different receiver gain settings; and a value of 3 is reserved.

2. The method as described in claim 1, wherein the variation in frequency response is caused by the sensing responder adjusting a low noise amplifier (LNA) switch for receiving data.

3. The method as described in claim 1, wherein the variation in frequency response is caused by the sensing responder device adjusting a various gain amplifier (VGA) for receiving data.

4. The method as described in claim 1, wherein the receiver OP gain type subfield is a 2-bit subfield comprising at least one of: a value of 0 indicating that neither an OP index nor a gain index are reported, and that values of the receiver OP gain index subfield are reserved; a value of 1 indicating that a receiver OP index is reported in the receiver OP gain index subfield, wherein the receiver OP gain index comprises different frequency response categories; a value of 2 indicating that a receiver gain index is reported in the receiver OP gain index subfield, wherein the receiver gain index comprises different values associated with different receiver gain settings; and a value of 3 is reserved.

5. A method of wireless sensing performed over a wireless network, the method comprising:

transmitting, by a sensing initiator, a sensing null data packet (NDP);

receiving, from a sensing responder, a channel state information (CSI) report responsive to the sensing NDP, wherein the CSI report comprises receiver frequency response information determined by performing a channel estimation operation; and performing a wireless sensing operation according to the frequency response information, wherein the frequency response information pertains to a frequency response of the sensing responder, and the performing a wireless sensing operation comprises indicating the frequency response variation of the sensing responder, wherein the CSI report comprises at least one of: a receiver operating point (OP) gain type subfield; and a receiver OP gain index subfield, and wherein the receiver OP gain index is a segregated index comprising a plurality of receiver OP gain index values corresponding to different receiver antennas.

6. The method as described in claim 5, wherein the receiver OP gain index is divided into octets.

7. The method as described in claim 6, wherein the receiver OP gain index further comprises a number of padding bits ($N_{pad}$) between the receiver OP gain index values of the plurality of receiver OP gain index values according to the equation:

$$N_{pad} = \left\lceil \frac{m}{8} \right\rceil \times 8 - m,\ 0 \le N_{pad} \le 7,$$

wherein m represents a number of bits per subfield.

8. A method of wireless sensing performed over a wireless network, the method comprising:

transmitting, by a sensing initiator, a sensing null data packet (NDP);

receiving, from a sensing responder, a channel state information (CSI) report responsive to the sensing NDP, wherein the CSI report comprises receiver frequency response information determined by performing a channel estimation operation; and performing a wireless sensing operation according to the frequency response information; and receiving another CSI report from the sensing responder, and comparing the CSI report to the another CSI report to detect small changes in frequency response using a same receiver configuration, wherein the frequency response information pertains to a frequency response of the sensing responder, and the performing a wireless sensing operation comprises indicating the frequency response variation of the sensing responder, and wherein the CSI report comprises at least one of: a receiver operating point (OP) gain type subfield; and a receiver OP gain index subfield.

9. The method as described in claim 8, wherein the CSI report and the another CSI report are generated during a same sensing measurement report phase.

10. A method of wireless sensing performed over a wireless network, the method comprising:

transmitting, by a sensing initiator, a sensing null data packet (NDP);

receiving, from a sensing responder, a channel state information (CSI) report responsive to the sensing NDP, wherein the CSI report comprises receiver frequency response information determined by performing a channel estimation operation;

performing a wireless sensing operation according to the frequency response information, wherein the frequency response information pertains to a frequency response of the sensing responder, and the performing a wireless sensing operation comprises indicating the frequency response variation of the sensing responder, and wherein the CSI report comprises at least one of: a receiver operating point (OP) gain type subfield; and a receiver OP gain index subfield; and receiving another CSI report from the sensing responder device, and combining the CSI report to the another CSI report to more effectively detect small changes in frequency response using a same receiver configuration.

11. A transmitter apparatus for performing wireless sensing, the apparatus comprising:

a processor;

a memory coupled to the processor and operable to store data; and a radio under control of said processor and operable to perform wireless sensing, and wherein the processor is operable to cause the radio to:

transmit a sensing null data packet (NDP);

receive a channel state information (CSI) report responsive to the sensing NDP, wherein the CSI report comprises receiver frequency response information; and perform a wireless sensing operation according to the frequency response information, wherein the CSI report comprises a receiver operating point (OP) gain type subfield; and a receiver OP gain index subfield, and wherein the receiver OP gain type subfield is a 2-bit subfield comprising at least one of: a value of 0 indicating that neither a receiver OP index nor a gain index are reported, and that values of the receiver OP gain index subfield are reserved; a value of 1 indicating that a receiver OP index is reported in the binary receiver OP gain index subfield, wherein the receiver OP index comprises different frequency response categories; a value of 2 indicating that a receiver gain index is reported in the receiver OP gain index subfield, wherein the receiver gain index comprises different gain values associated with different frequency response variations; and a value of 3 is reserved.

12. The transmitter apparatus as described in claim 11, wherein the variation in frequency response is caused by an adjustment to a low noise amplifier (LNA) switch for receiving data.

13. The transmitter apparatus as described in claim 11, wherein the variation in frequency response is caused by an adjustment to a various gain amplifier (VGA) for receiving data.

14. The transmitter apparatus as described in claim 11, wherein the receiver OP gain type subfield is a 2-bit subfield comprising at least one of: a value of 0 indicating that neither a receiver OP index nor a gain index are reported, and that values of the receiver OP gain index subfield are reserved; a value of 1 indicating that a receiver OP index is reported in the binary receiver OP gain index subfield, wherein the receiver OP index comprises different frequency response categories; a value of 2 indicating that a receiver gain index is reported in the receiver OP gain index subfield, wherein the receiver gain index comprises different gain values associated with different frequency response variations; and a value of 3 is reserved.

15. A transmitter apparatus for performing wireless sensing, the apparatus comprising:

a processor;

a memory coupled to the processor and operable to store data; and a radio under control of said processor and operable to perform wireless sensing, and wherein the processor is operable to cause the radio to:

transmit a sensing null data packet (NDP);

receive a channel state information (CSI) report responsive to the sensing NDP, wherein the CSI report comprises receiver frequency response information; and perform a wireless sensing operation according to the frequency response information, wherein the CSI report comprises a receiver operating point (OP) gain type subfield; and a receiver OP gain index subfield, and wherein the receiver OP gain index is a segregated index comprising:

different receiver OP gain index values corresponding to different receiver antennas; and a number of padding bits ($N_{pad}$) between the different receiver OP gain index values according to the equation:

$$N_{pad} = \left\lceil \frac{m}{8} \right\rceil \times 8 - m,\ 0 \leq N_{pad} \leq 7,$$

wherein m represents a number of bits per subfield.

* * * * *